United States Patent [19]

Moore et al.

[11] Patent Number: 5,530,963
[45] Date of Patent: Jun. 25, 1996

[54] METHOD AND SYSTEM FOR MAINTAINING ROUTING BETWEEN MOBILE WORKSTATIONS AND SELECTED NETWORK WORKSTATION USING ROUTING TABLE WITHIN EACH ROUTER DEVICE IN THE NETWORK

[75] Inventors: Victor S. Moore, Delray Beach; Richard G. Van Duren, Big Torch Key; David C. Wu, Boca Raton, all of Fla.

[73] Assignee: International Business Machines Corporation, Armonk, N.Y.

[21] Appl. No.: 168,693

[22] Filed: Dec. 16, 1993

[51] Int. Cl.⁶ .................................................. G06F 13/00
[52] U.S. Cl. ........................ 395/200.15; 395/200.12; 370/95.1; 379/59; 364/222.2; 364/284.3; 364/284.4; 364/DIG. 1
[58] Field of Search .................... 395/200, 200.2, 395/200.09, 200.12, 200.15; 370/85.1, 95.1; 379/59; 455/33.1

[56] References Cited

U.S. PATENT DOCUMENTS

| | | | |
|---|---|---|---|
| 4,621,362 | 11/1986 | Sy | 370/85.14 |
| 4,680,581 | 7/1987 | Kozlik et al. | 370/85.4 |
| 4,901,340 | 2/1990 | Parker et al. | 379/60 |
| 4,984,247 | 1/1991 | Kaufmann et al. | 375/200 |
| 5,095,480 | 3/1992 | Fenner | 370/94.1 |
| 5,123,029 | 6/1992 | Bantz et al. | 375/202 |
| 5,305,466 | 4/1994 | Taketsugu | 455/33.1 |
| 5,353,331 | 10/1994 | Emery et al. | 379/58 |
| 5,371,738 | 12/1994 | Moelard et al. | 370/85.1 |
| 5,396,543 | 3/1995 | Beeson et al. | 370/94.1 |
| 5,410,543 | 4/1995 | Seitz | 370/85.13 |
| 5,416,780 | 5/1995 | Patel | 370/95.3 |

FOREIGN PATENT DOCUMENTS

| | | |
|---|---|---|
| 0475865A2 | 3/1992 | European Pat. Off. . |
| 0483546A1 | 5/1992 | European Pat. Off. . |

*Primary Examiner*—Thomas C. Lee
*Assistant Examiner*—Moustafa Mohamed Meky
*Attorney, Agent, or Firm*—Richard A. Tomlin; Andrew J. Dillon

[57] ABSTRACT

A method and system for maintaining a routing path between a selected workstation within a multisegment local area network and a mobile workstation wherein individual segments within the multisegment local area network are interconnected by a router device and wherein selected segments within the multisegment local area network include radio frequency transceivers adapted to provide a wireless communications link with mobile workstations. Each time communication is established between a mobile workstation and a selected workstation within the multisegment local area network via a radio frequency transceiver a routing table entry is established which identifies a segment location for the mobile workstation within a routing table associated with each router device within the multisegment local area network. A routing table entry is also established which identifies a segment location for the selected workstation within the routing table associated within each router device within the multisegment local area network in response to each attempt at establishment of communication between the selected workstation and the mobile workstation. Thereafter, all routing table entries which identify the segment location for a mobile workstation are automatically deleted in response to a termination of communications between the mobile workstation and the radio frequency transceiver. Routing path determination for communications between a mobile workstation and any workstation within the multisegment local area network may then be determined by reference to a routing table associated with each router device within a multisegment local area network without requiring the maintenance of routing path information at each workstation within the multisegment local area network.

6 Claims, 5 Drawing Sheets

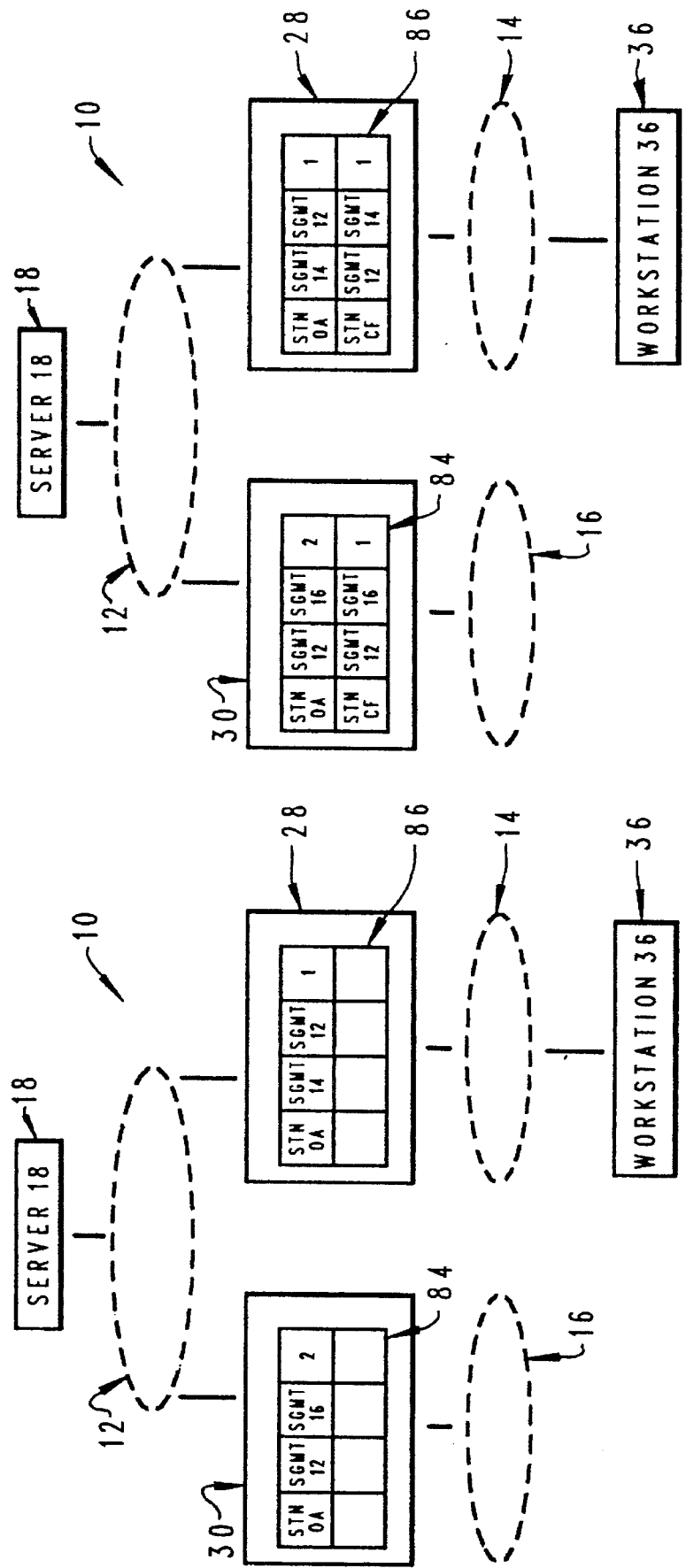

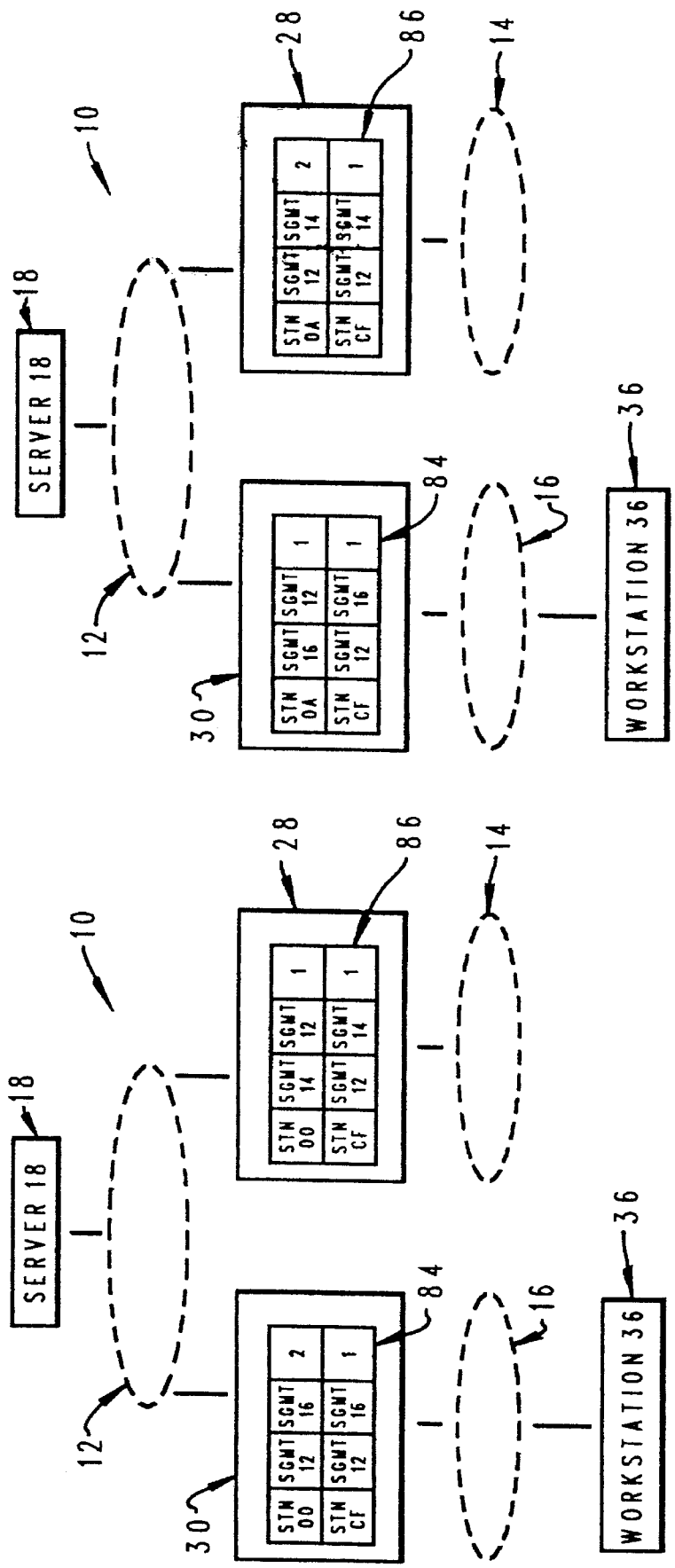

METHOD AND SYSTEM FOR MAINTAINING ROUTING BETWEEN MOBILE WORKSTATIONS AND SELECTED NETWORK WORKSTATION USING ROUTING TABLE WITHIN EACH ROUTER DEVICE IN THE NETWORK

BACKGROUND OF THE INVENTION

1. Technical Field

The present invention relates in general to improved communication within a multisegment local area network and in particular to improved communication within a multisegment local area network which includes mobile workstations which are coupled to the network via radio frequency transceivers. Still more particularly, the present invention relates to improved communication within a multisegment local area network which includes mobile workstations without requiring the maintenance of routing path information at each workstation within the network.

2. Description of the Related Art

Computer networks are increasingly common in the modern workplace. Such networks typically include multiple workstations and host or server devices which may be distributed over a vast geographic distance. Many different network topologies exist for interconnecting multiple computers into a distributed data processing system. One common technique for interconnecting multiple computers within a data processing network is the so-called Token Ring local area network environment. The Token Ring network environment is defined by the IEEE 802.5 standard and is well known to those having ordinary skill in the art.

In a Token Ring local area network environment, the path which data travels from one workstation to another workstation or host/server device, is established during initialization. This path is normally established by a discovery process utilizing "broadcast" messages, such as TESTS or XID. A Token Ring bridge or router device builds a path on which the broadcast frame travels by concatenating the router address with the routing information field of the broadcast messages. Thus, once a path has been established, it will not change during the duration of the communication session between elements within the network. If for some reason the path is disconnected during a communication session, the session must be terminated and a new path reestablished by re-initiating the session.

In other local area networks, devices within the network are interconnected utilizing router devices which maintain knowledge of all network interconnections. That is, the path required to traverse the network from one workstation to a second workstation, or host/server device. The logical name of a server device or workstation normally includes both the unit identification and the network identification in which the system or station is connected. During station initialization a broadcast message is also utilized to establish a path between the initializing station and the targeted system. The router device utilizes the network identification as part of the station address in order to establish a path between stations. Again, once a path is established it remains unchanged during the entire communications session.

Mobile or remote workstations are often interconnected into such networks utilizing so-called "dial up" facilities. Such workstations "call up" a local area network Gateway entity through a Public Switched Telephone Network (PSTN). As above, once such a connection has been made, the path between the workstation and the connecting host is fixed for the duration of the communications session. A mobile workstation may be allowed to relocate within the Public Switched Telephone Network (PSTN), utilizing systems which permits variance in the portion of the link from the mobile workstation to a local cellular receiving station. See for example, U.S. Pat. No. 4,984,247 and U.S. Pat. No. 4,901,340. A new connection and session must be reestablished if the workstation moves to a different location which alters the location of the link with the Public Switched Telephone Network (PSTN).

In a modern multisegment local area network, mobile workstations may be connected to host system or other workstations within the network through a radio frequency transceiver station. In a manner similar to that utilized in a cellular telephone system when the mobile workstation travels throughout the network environment, the interconnection with the mobile workstation may be changed from one radio frequency transceiver station to a second radio frequency transceiver station. In prior art system this requires the connecting path between the host system or workstation and the mobile workstation to be altered, dependent upon the new location of the mobile workstation.

Local area networks which utilize wireless connections without accessing a Public Switched Telephone Network (PSTN) are often established within corporate offices, college campuses or other similar locations. Thus, it should be apparent that a method and system whereby a mobile workstation may maintain a routing path to a host/server device or other workstation despite relocation within a multisegment local area network would be highly advantageous.

SUMMARY OF THE INVENTION

It is therefore one object of the present invention to provide improved communication within a multisegment local area network.

It is another object of the present invention to provide improved communication within a multisegment local area network which includes mobile workstations which are coupled to the network via radio frequency transceivers.

It is yet another object of the present invention to provide improved communication within a multisegment local area network which includes mobile workstations without requiring the maintenance of routing path information at each workstation within the network.

The foregoing objects are achieved as is now described. The method and system of the present invention may be utilized to maintain a routing path between a selected workstation within a multisegment local area network and a mobile workstation wherein individual segments within the multisegment local area network are interconnected by a router device and wherein selected segments within the multisegment local area network include radio frequency transceivers adapted to provide a wireless communications link with mobile workstations. Each time communication is established between a mobile workstation and a selected workstation within the multisegment local area network via a radio frequency transceiver a routing table entry is established which identifies a segment location for the mobile workstation within a routing table associated with each router device within the multisegment local area network. A routing table entry is also established which identifies a segment location for the selected workstation within the routing table associated within each router device within the multisegment local area network in response to each attempt at establishment of communication between the selected workstation and the mobile workstation. Thereafter, all routing table entries which identify the segment location for a mobile workstation are automatically deleted in response to a termination of communications between the mobile workstation and the radio frequency transceiver. Routing path determination for communications between a mobile workstation and any workstation within the multisegment local area network may then be determined by reference to a routing table associated with each router device within a multisegment local area network without requiring the maintenance of routing path information at each workstation within the multisegment local area network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A–5D are pictorial representations of the maintenance of routing paths within routing tables in each router device within the multisegment local area network of FIG. 1 in accordance with the method and system of the present invention.

DETAILED DESCRIPTION OF PREFERRED EMBODIMENT

Figure 1:
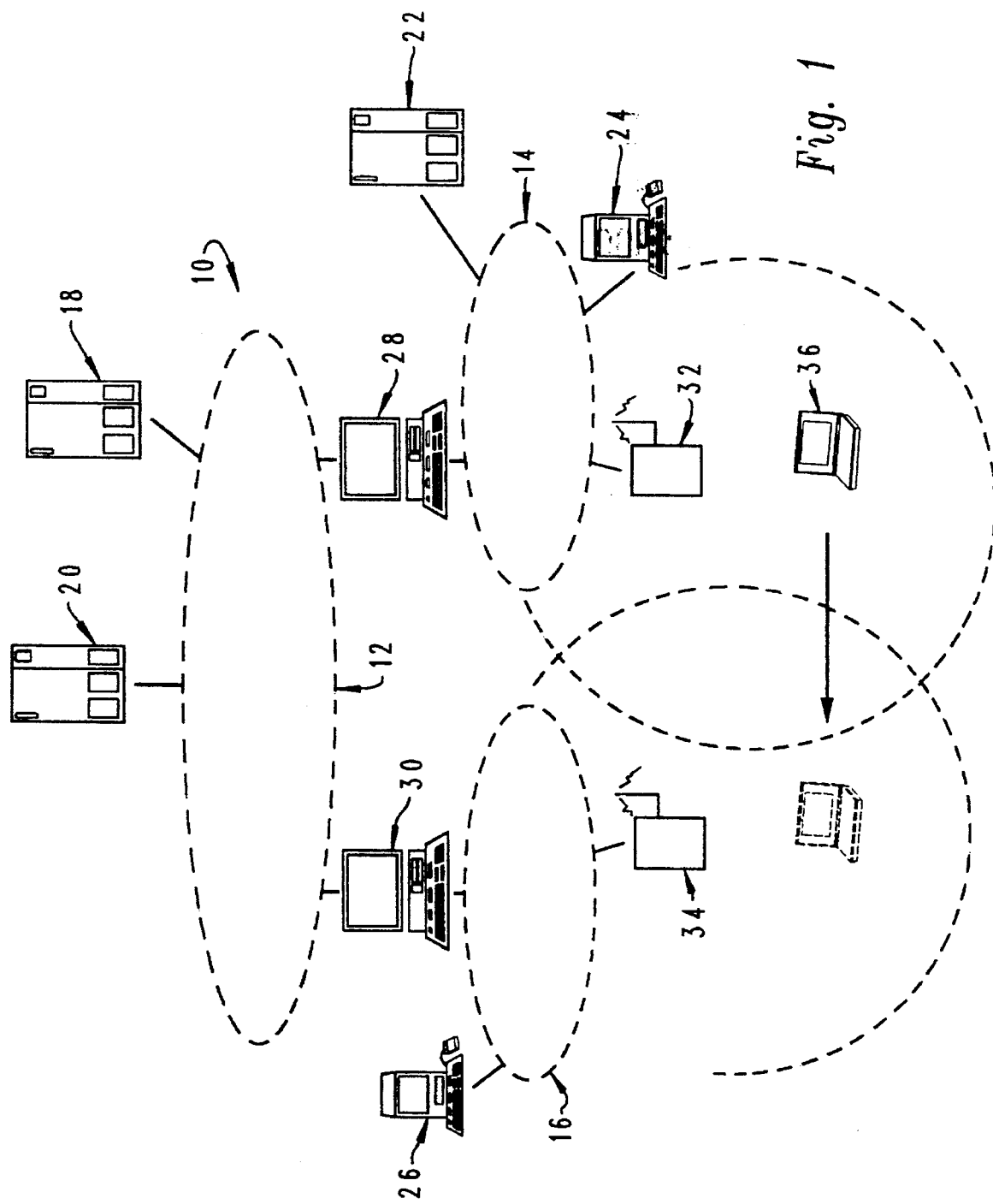
FIG. 1 is a pictorial representation of a multisegment local area network which includes at least one mobile workstation which may be utilized to implement the method and system of the present invention.

With reference now to the figures and in particular with reference to FIG. 1, there is depicted a pictorial representation of a multisegment local area network 10 which includes at least one mobile workstation which may be utilized to implement the method and system of the present invention. As illustrated, multisegment local area network 10 includes a plurality of local area network segments 12, 14 and 16. Disposed at various points throughout multisegment local area network 10 are various computer devices such as host/servers 18, 20, and 22. Additionally, workstations such as workstations 24 and 26 may also be present in large numbers within multisegment local area network 10.

As those skilled in the art will appreciate upon reference to the foregoing, multiple segments within multisegment local area network 10 are typically interconnected utilizing a router device, such as router devices 28 and 30. Typically, a router device includes a ring station on each ring to which that router device is attached. The router device copies communication frames destined for other segments within the multisegment local area network and transmits communication frames from other segments destined for the local segment. Router device 28 and 30 may be implemented utilizing any appropriately programmed computer such as the International Business Machines Corporation PS/2 computer.

Also coupled to various segments within multisegment local area network 10 are radio frequency transceivers 32 and 34. In the manner described above, radio frequency transceivers 32 and 34 make it possible for mobile workstations which include radio frequency communication devices to freely move throughout the areas serviced by multisegment local area network 10. Radio frequency transceivers 32 and 34 may be implemented utilizing existing equipment such as the Range LAN, manufactured by Proxim. Mobile workstation 36, which may be implemented utilizing any suitable portable computer which includes radio frequency communications capability, such as the HP100, manufactured by Hewlett-Packard Company, may be utilized anywhere within the effective range of radio frequency transceiver devices 32 and 34 and, in accordance with the method and system of the present invention, a routing path between mobile workstation 36 and a selected workstation or host/server device will be maintained.

Figure 2:
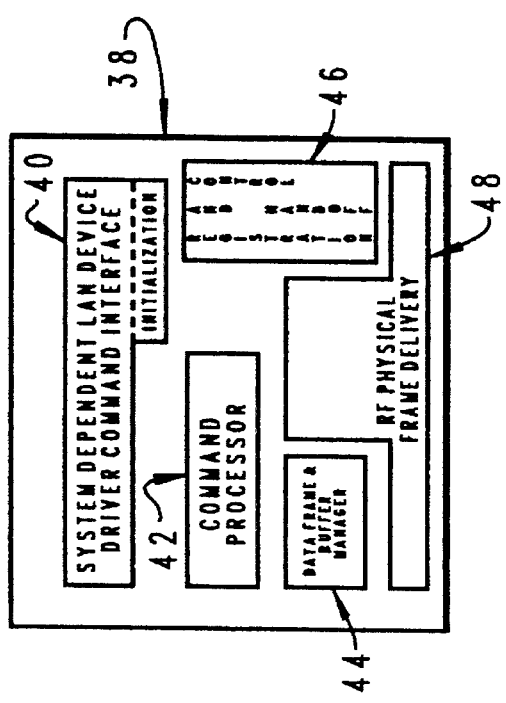
FIG. 2 is a high level block diagram of a device driver which may be utilized to link a mobile workstation with a multisegment local area network in accordance with the method and system of the present invention.

Referring now to FIG. 2, there is depicted a high level block diagram of a device driver which may be utilized to link mobile workstation 36 of FIG. 1 with a multisegment local area network in accordance with the method and system of the present invention. Device driver 38 is a Medium Access Control (MAC) sub-layer. Device driver 38 is thus written according to the operating system dependent local area network (LAN) driver interface, such as NDIS. Thus, to mobile workstation 36 device driver 38 presents a Token Ring (IEEE Standard 802.5) appearance.

Device driver 38 also includes command processor 42, data frame and buffer manager 44 and radio frequency physical frame delivery segment 48. Each of these segments operates in a manner well known to those having ordinary skill in the art. In accordance with an important feature of the present invention device driver 38 also includes a registration and hand off control 46 which provides the registration process between mobile workstation 36 and a radio frequency transceiver, as well as controlling the "hand off" sequences as a mobile workstation moves from one radio frequency transceiver to a second radio frequency transceiver.

In accordance with the method and system of the present invention, registration and hand off control 46 utilizes various primitives between registration and hand off control 46 and device driver 38. These primitives have local significance and are based in part, upon the operating environment and functional capability of device driver 38. These primitives, which will be described in greater detail herein, include: Open.request; Open.confirm; Close.request; Close.confirm; close.indicates; Add_Group_Address.request; Deleted_Group_Address.request; and Set_Functional_Address.request.

The primitive "Open.request" provides the radio frequency physical layer and the radio frequency transceiver with the "Physical unit" address of mobile workstation 36. This primitive defines the registration process from device driver 36 to registration and hand off control 46. This primitive enables mobile workstation 36 to broadcast its presence to any radio frequency transceiver within multisegment local area network 10. This primitive takes the form:

---
Open.request
{
   TR_unit_address
}
---

The "TR_unit_address" parameter specifies the individual Token Ring entity address. This parameter is a six byte field which is defined by the IEEE 802.5 Standard. This primitive will be generated when registration and hand off control 46 broadcasts a "Registration Request" message to any radio frequency transceiver.

The "Open.confirm" primitive defines the confirmation from registration and hand off control 46 to device driver 38, whether or not there is a radio frequency transceiver within range of mobile workstation 36. This primitive takes the form:

---
Open.confirm
{
   Open_status
}
---

The "Open_status" parameter defines either a positive or negative status, based upon the availability of a receiving radio frequency transceiver. If the status is positive, mobile workstation 36 is enabled. If the response status is negative, device driver 38 will begin a recovery or retry process. This primitive is generated in response to an "Open_request" from device driver 38.

Next, the "Close.request" primitive is utilized to remove the address of a local station from all radio frequency transceivers within multisegment local area network 10. A station thus identified is disabled from sending or receiving any messages within multisegment local area network 10. All Group and Functional addresses defined by this station will be deleted from all radio frequency transceivers within multisegment local area network 10. This primitive takes the form:

---
Close.request
{
   TR_unit_address
}
---

The "TR_unit_address" parameter specifies the individual Token Ring entity address which was specified in the "Open.request" primitive. This primitive is generated when registration and hand off control 46 broadcasts a "DE-Register Request" message to any radio frequency transceiver within multisegment local area network 10. After this message is received by a radio frequency transceiver within multisegment local area network 10, the radio frequency transceiver will delete that station's Unit Address; Associated group and Functional addresses from its routing table.

The "Close.confirm" primitive defines the confirmation from registration and hand off control 46 to device driver 38 that the physical unit is disabled from sending or receiving any messages. This primitive takes the form:

---
Close.confirm
{
   Close_status
}
---

Wherein the "Close_status" always defines a positive status. This primitive is generated in response to a Close_request from device driver 38.

Next, the "Close.indicate" primitive defines to device driver 38 that the station is moving out of range of any radio frequency transceivers and that the physical radio frequency disconnection will be disconnected. The station is thus closed. That station address, its Group and Functional addresses will be deleted from all radio frequency transceivers within multisegment local area network 10. This primitive takes the form:

---
Close.indicate
{
}
---

This primitive is generated when registration and hand off control 46 determines that a mobile workstation 36 is now out of the range of any radio frequency transceivers within multisegment local area network 10. Registration and hand off control 46 will then reset the physical adapted and all software parameters. Device driver 38 must thereafter issue an "Open.request" in order to reestablish radio frequency connections.

The "Add_Group_Address" request primitive defines a Group (Multicast) address and allows the station to respond to this address. This primitive takes the form:

---
Add_Group_Address.request
{
   Group_Address
}
---

Wherein the "Group_Address" parameter is a six byte field which is defined by the IEEE 802.5 Standard. This primitive is generated in response to registration and hand off control 46 generating a "RF_Add_Group.request" to a radio frequency transceiver in order to inform the transceiver to decode this address as part of mobile workstation 36's profile.

Next, the "Delete_Group_Address.request" primitive is utilized to remove the Group (Multicast) address and forbid that station to respond to this address. This primitive takes the form:

---
Delete_Group_Address.request
{
   Group_Address
}
---

Wherein the "Group_Address" parameter is a six byte field which is defined by the IEEE 802.5 Standard. This primitive is generated in response to registration and hand off control 46 generating a "RF_Delete_Group.request" to a radio frequency transceiver in order to inform the transceiver to remove this address from the profile of mobile workstation 36.

Finally, the "Set_Functional_Address.request" primitive defines the Functional address and allows the station to respond to that address. This primitive takes the form:

```
Set_Functional_Address.request
{
    Functional_Address
}
```

Wherein the "Functional_Address" parameter is a six byte field which is defined by the IEEE 802.5 Standard. A "Functional Address" mask containing al zeroes will reset the "Functional_Address" for a particular station. This primitive is generated in response to registration and hand off control 46 generating a "RF_Set_Functional Address-.request" to the radio frequency transceiver in order to inform the transceiver to decode this address as part of the profile of mobile workstation 36.

Figure 3:
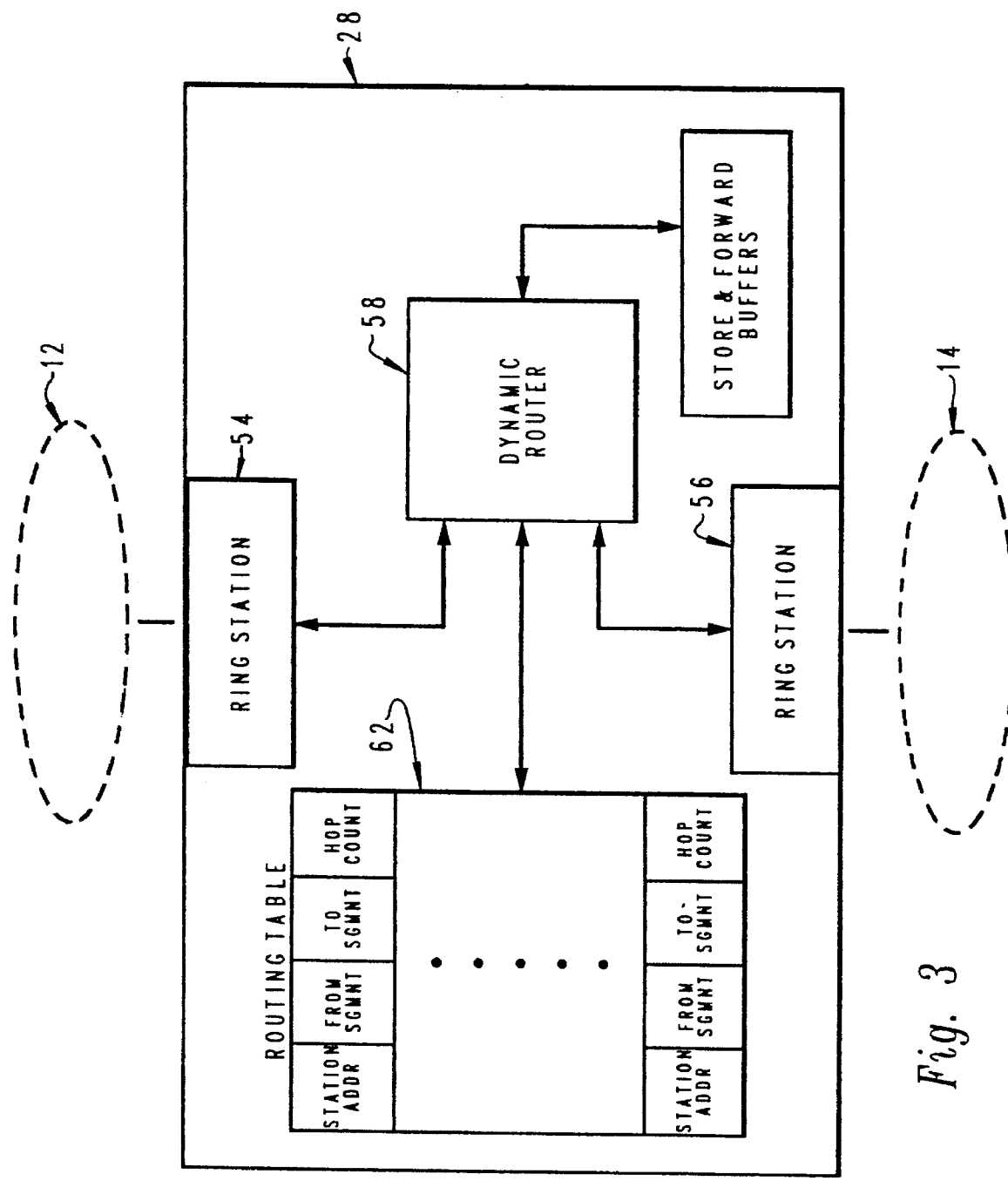
FIG. 3 is a high level block diagram of a router device which may be utilized to interconnect segments of the multisegment local area network of FIG. 1 in accordance with the method and system of the present invention.

With reference now to FIG. 3, there is depicted a high level block diagram of a router device 28 which may be utilized to link a mobile workstation with a multisegment local area network in accordance with the method and system of the present invention. As described above, in a multisegment local area network the segments within the local area network are interconnected utilizing a router device. Radio frequency transceivers within a multisegment local area network are thus interconnected through a series of such router devices. As a mobile workstation moves from one radio frequency transceiver location to a second radio frequency transceiver location, the routing between the radio frequency transceiver and the connecting workstation or host/server device must necessarily change. In order to maintain logical connectivity between a mobile workstation and the host/server device, routing between the two units must preferably be done in a transparent manner. In order for normal workstations to coexist in such a network with mobile workstations which are interconnected utilizing radio frequency transceiver devices, routing between such devices must be accomplished utilizing normal architected Token Ring frames.

Router device 28 is thus interposed between two Token Ring segments, such as segment 12 and segment 14. Router device 28 thus includes a ring station on each segment to which the router device is attached. Thus, ring station 54 is a ring station within segment 12 and ring station 56 is recognized as a ring station within segment 14. All token ring frames destined for other segments within multisegment local area network 10 are then copied by router device 28 and router device 28 also transmits Token Ring frames from other segments which are destined for a local segment.

In accordance with an important feature of the present invention, router device 28 includes a dynamic router 58 which is responsible for address recognition and the construction of a routing table 62 in accordance with an important feature of the present invention. As illustrated, routing table 62 preferably includes a series of entries which identify a station address for each station which originates a Token Ring frame, as well as the identification of the segment from which that frame originated, an identification of the segment to which that frame is directed and a so-called "hop" count which identifies the number of router devices, including the current router device, through which a particular frame has been transmitted. In a manner which will be explained in greater detail herein, routing table 62 may thus be utilized to maintain a routing path from a mobile workstation to a workstation or host/server device within multisegment local area network 10 without requiring the duplication of that routing information at all workstations within multisegment local area network 10.

Figure 4:
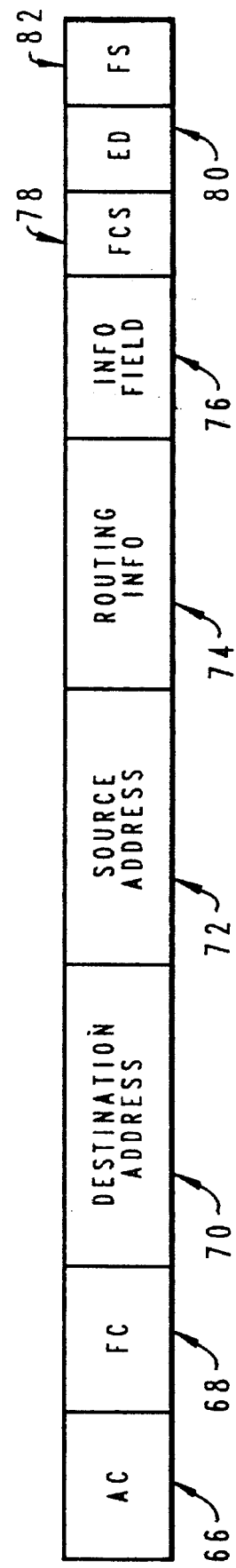
FIG. 4 is a pictorial representation of a Token Ring Frame Format which may be utilized to implement the method and system of the present invention.

Referring now to FIG. 4, there is depicted a pictorial representation of a Token Ring Frame Format which may be utilized to implement the method and system of the present invention. This Token Ring format is defined by the IEEE 802.5 Standard and is composed of a number of fields which are each one or more bytes in length. As illustrated, Token Ring format 64 includes an access control field 66, a frame control field 68, a destination address field 70 and a source address field 72. A routing information field 74, an information field 76 are optionally provided and not normally utilized in the prior art Token Ring networks. However, in accordance with the method and system of the present invention two special primitives are utilized to establish or remove routing paths and are included within information field 72. These primitives are: "DR_Routing_Request" and "DR_Delete_Address." Finally, a frame check sequence field 78, an ending delimiter field 80 and a frame status field 82 are also provided.

The method and system of the present invention utilizes this normal architected Token Ring Frame Format and makes certain assumptions with regard to the network. Firstly, as noted extensively herein, it is assumed that the network utilizes the IEEE 802.5 Token Ring protocol. Next, it is assumed that all segments within multisegment local area network 10 are interconnected utilizing the "Dynamic Router" technique only and that the Token Ring "Source Routing" function is not utilized by any station or host/server device. Further, it is also assumed that all stations are logically connected on one network and that all station addresses are unique within that network. There must also be an Active Monitor on each segment within multisegment local area network 10 and the Dynamic Routing Function must have a unique Functional Address. There must also be a Dynamic Routing Manager which assigns and administers "ring numbers" for each segment connecting to a router device. All stations within the network must be configured in a hierarchical topology, that is no loops are permitted and parallel routers between individual segments of multisegment local area network 10 are not supported. Those skilled in the network art will appreciate that these assumptions are clearly within the scope and content of most Token Ring networks which are defined by the IEEE 802.5 Standard.

Next, a series of pseudocode implementations for the various processes to implement the method and system of the present invention are illustrated. As described herein each segment within multisegment local area network 10 may be alternately referred to as a "ring" and each workstation or host/server device on a segment as a "ring station." Thus, each time a Token Ring frame of the format set forth within FIG. 4 arrives at a ring station, dynamic router 58 of router device 28 will receive that frame and store it within store and forward buffer 60 (see FIG. 3) and will execute the following process:

```
 5   STRUCTURE Table_entry {
 6              Station_Address ;
 7              From_Ring_Id    ;
 8              To_Ring_Id      ;
 9              Hop_count       ;
10              }
11
12   STRUCTURE Table_entry Routing_Table ARRAY [Table_size]
13
14   STRUCTURE Routing_Frame {
15       RD_Destination_addr INITIAL (Dynamic_Route_Functional_Addr);
16       Source_Ring_Station ;
17       Primitive_code ;
18       Station_Address;
19       Hop_Count  ;
20       }
21
22   CHAR Temporary_buffer [Max_Frame_Size]
23
24   INTEGER Current_Ring_Id
25   INTEGER Index
26   INTEGER Empty_index
27
28   BOOLEAN Build_Table INITIAL (TRUE)
29   BOOLEAN Routing_Req INITIAL (FALSE)
30   BOOLEAN Forward_Frame INITIAL (FALSE)
31   BOOLEAN Ignore_Frame INITIAL (FALSE)
32
33              Next, the process which is utilized for receiving a Token Ring
34   frame from a ring station is illustrated:
35   PROCEDURE Main:
36   BEGIN
37
38   Temporary_buffer: = Received frame
39   Current_Ring_Id: = The ID of the ring from which the frame
40         is received
41   Call Process_Destination_Address ;
```

```
1   Call Process_Source_Address ;
2
3   IF Forward_Frame: = TRUE THEN
4         Set Frame Copied in the Frame_Status of the incoming frame
5
6   IF Routing_Req := TRUE THEN
7         SEND_frame (Routing_frame)
8
9   IF Forward_Frame := TRUE THEN
10        SEND_frame (Temporary_buffer)
11
12  END
13
14                  The process for handling a "Destination Address" is reproduced
15  below:
16  PROCEDURE Process_Destination_Address:
17  BEGIN
18
19  Read Destination_Address field from incoming frame
20  IF (Destination_Address = Dynamic Route Functional_Address)
21        IF (Primitive_Code = DR_Routing_Req) THEN
22          Forward_Frame: = TRUE
23          call Establish_Routing_Table;
24        ELSE
25          IF (Primitive_Code = RD_Delete_Address) THEN
26        Forward_Frame: = TRUE
27          call Delete_Address ;
28        Build_Table: = FALSE
29
30  ELSE
31        IF (Destination_Address = Group_Address) OR
32          (Destination _Address = Functional_Address) THEN
33          Forward_Frame := TRUE
34        ELSE
35
36        index := 0
37        Do until index = Table_Size
38          IF (Table_entry[index].Station_Address EQUAL
39              Destination_Address) AND
40              (Table_entry[index].Frin_Ring_ID EQUAL
41              Current_Ring_ID) THEN
42
43              Forward-Frame := TRUE
```

```
             Exit Do
       End_Do

END

The process which is utilized to process a "Source Address" is
listed below:
PROCEDURE Process_Source_Address:
BEGIN Read Source_Address field from incoming frame
index : = 0
Do until index = Table_Size
IF (Table_entry[index].Station_Address EQUAL
      Source_address) THEN
      Ignore_Frame:= TRUE
      Exit do
End_do
IF (Ignore_frame EQUAL FALSE)
      Locate first empty slot [Empty_index] in the Routing Table
      Create an entry (Empty_index) in the Routing_Table where
        Table_entry[Empty_index].Station_Address:= Source_address
        Table_entry[Empty_index].From_Ring_Id := Current_Ring_ID
        Table_entry[Empty_index].To_Ring_ID := Ring_Id on which frame
            is to be forwarded.
Create a RD_Routing_Req frame
      Routing_frame.Source_Ring_Station := Ring_Station_ID on which
        this frame is to be forwarded.
      Routing_frame.Primitive := DR_Routing_req
      Routing_frame.Station_address :+ Source_address
      Routing_frame.Hop_count := 1
      Routing_Req := TRUE
END The   process   which   is   utilized   to   process   a
"DR_Routing_Request" frame is listed below:

PROCEDURE Establish_Routing_Table :
BEGIN

Routing_frame := Temporary_buffer
```

```
1   Routing_frame.Hop_count := Routing_frame.Hop_count + 1
2
3   Do until index = Table_Size
4     IF (Table_entry[index].Station_Address EQUAL
5         Routing_frame.Station_address)
6         Ignore_frame := TRUE
7         Exit do
8
9   End_Do
10
11  Locate first empty slot [Empty_index] in the Routing Table
12  IF (empty entry found) AND (Ignore_frame := FALSE) THEN
13    Table_entry[Empty_index].Station_Address :=
14        Routing_frame.Station_address
15    Table_entry[Empty_index].From_Ring_Id := Current_Ring_ID
16    Table_entry[Empty_index].To-Ring_ID : Ring_Id on which
17        frame is to be forwarded.
18    Table_entry[Empty_index].Hop_count :=
19        Routing_Frame.Hop_count
20    Routing_Req := TRUE
21  END
22
```

Next, the processing of a "DR_Delete_Address" frame is accomplished utilizing the following process:

```
25  PROCEDURE Delete_Address :
26  BEGIN
27
28  Forward_frame := TRUE
29
30  Do until index = Table_Size
31    IF (Table_entry[index].Station_Address EQUAL
32        Routing_frame.Station_address)
33        Table_entry[index].Station_Address := 0
34        Exit do
35  End_Do
36
37  END
38
```

Finally, the process utilized by a radio frequency transceiver which receives a frame from a mobile workstation is set forth below:

```
42  PROCEDURE RF Receiver:
```

```
1  BEGIN
2
3  RF_Receiver receives a frame from the Mobile Work Station
4  IF (RF_primitive = 'Log_in') OR
5    (RF_primitive = 'Set_Functional_address) OR
6    (RF_primitive = 'Set_Group_Address) THEN
7    Save & Enables Receive Ring station to decode the received address
8  ELSE
9    IF(RF_primitive = 'Close_Station') THEN
10     Destination_Address := Dynamic_Route Functional_Address
11     Primitive_Code := RD_Delete_Address
12     Station_Address := SA
13     Broadcast a DR_Delete_Address frame
14     Disables Receive Ring station to decode all saved
15       received address
16
17   IF (RF_primitive = 'Connect Req) THEN
18     Destination_Address := Dynamic_Route Functional_Address
19     Primitive_Code := RD_Routing_Request
20     Station_Address := SA
21     Broadcast a DR_Routing_Req frame
22     Save & Enables Receive Ring station to decode the received
23       addresses
24
25   IF 'OUT OF RANGE" detected"
26     Generate RF_Hands_Off.indicate to Mobile Work Station
27     Destination_Address := Dynamic_Route Functional_Address
28     Primitive_Code := RD_Delete_Address
29     Station_Address := SA
30     Broadcast a DR_Delete_Address frame
31     Disables Receive Ring station to decode all saved
32       received address
33 END
```

Next, FIGS. 5A–5D represent pictorial representation of the maintenance of routing paths within routing tables in each router device within the multisegment local area network of FIG. 1 utilizing the processes set forth above. Referring to FIG. 1 and FIG. 5A, if mobile workstation 36 broadcasts a frame and is initially connected to radio frequency transceiver 32, radio frequency transceiver 32 will take on the address of mobile workstation 36, which is presumed to be "0A" for purposes of this illustration, as the ring station address. Radio frequency transceiver 32 will then broadcast a Token Ring frame identifying the originating station address as "0A" and the destination address as the functional address of host/server device 18. The functional address of host/server device 18 is for purposes of this illustration presumed to be "CF."

Next, router device 28 receives that message and makes a determination that a station address having the identification "0A" does not currently exist within its routing table. As illustrated within FIG. 5A, router device 28 builds a routing table 86 which lists the origination station as "0A" for a frame which originated in segment 14 and which is directed to segment 12. The "hop" count for this routing table is listed as "1" since only router device 28 has seen this frame.

Next, router device 28 will forward the DR_Routing_Request listing the origination station identification as "0A" and will forward the broadcast message to address "CF." This frame will then be broadcast onto segment 12. Router 30 will thus receive the Token Ring frame broadcast by router 28 within segment 12 and upon discovery that station "0A" is not within its routing table will build a routing table entry in the manner set forth at reference numeral 84. That is, the originating station is identified as "0A" and the segment from which the frame was received is identified as segment 12. The segment to which the frame was directed is segment 16 and the hop count is set at "2," indicating that both router device 28 and router device 30 have seen this frame. The request will be broadcast into segment 16; however, as there are no more router devices along this path, the frame will be discarded in accordance with the IEEE 802.5 Standard when it loops back to router device 30.

Next, the message intended for host/server device 18 having functional address "CF" is received by host/server device 18, which acknowledges that broadcast by sending a station to station message which identifies host/server device 18 as the origination address and mobile workstation 36 as the destination address. This acknowledgment will be routed around segment 12 and will be received by both router device 28 and router device 30. Router device 30 will examine this acknowledgement and note that the address listed for host/server device 18 is new. Thus, a routing table entry will be created within routing table 84 as shown in FIG. 5B. This new routing table entry identifies host/server device 18 as the origination station and sets forth the origination of that frame as segment 12 and the destination of that frame through router device 30 as segment 16. Router device 30 will then broadcast that frame to segment 16 and after that frame loops around segment 16 it will be destroyed, as no other router devices exist within that segment. Router device 30 also will detect the destination address of mobile workstation 36 within the acknowledgement message; however, the address from which that acknowledgement message was received is identical to the address for mobile workstation 36 presently within routing table 84 and thus that information will be ignored.

Router device 28 also receives the acknowledgement message and, as with router device 30 notes that the address for host/server device 18 is new. Thus, a new entry must be created for routing table 86 within router device 28. The new entry within routing table 86 sets forth the identify of host/server device 18 having its origin within segment 12 and its destination within segment 14. The frame is then forwarded to segment 14 and after that frame loops around segment 14 router device 28 will destroy that message. Additionally, router device 28 will also find the destination address for mobile workstation 36 within its routing table and will thus forward that frame to segment 14.

Next, radio frequency transceiver 32 will receive the forwarded frame and pass that information on to mobile workstation 36. Thereafter, communications between mobile workstation 36 and host/server device 18 may be accurately routed utilizing information contained within routing table 86 within router device 28.

Next, it is assumed that mobile workstation 36 will move from the vicinity of radio frequency transceiver 32 to the vicinity of radio frequency transceiver 34 (see FIG. 1 ). As radio frequency transceiver 32 detects that mobile workstation 36 is moving out of its range, it generates a "DR_Delete_Address" request with a source address identified as mobile workstation 36 to all routers within multisegment local area network 10. Radio frequency transceiver 32 also generates a "RF_Hand_Off.indicate" to mobile workstation 36. Router devices 28 and 30 each receive the "RF_Delete_Address" request and will thus remove all entries from their associated routing tables which identify mobile workstation 36. Thus, as set forth within FIG. 5C, the routing table entries for mobile workstation 36 within routing tables 84 and 86 have been deleted by setting the source address for that entry to "00."

Next, as mobile workstation 36 attempts communication with radio frequency transceiver 34 that transceiver will receive a "RF_Contact.request" from mobile workstation 36 and the ring station within radio frequency transceiver 34 will be enabled, identifying mobile workstation 36 as a station address. The Functional and Group address are set forth which are enclosed with the "RF_Contact.request." Radio frequency transceiver 34 then constructs and broadcasts a "DR_Routing.Request" identifying mobile workstation 36. As described above, router devices 38 and 30 will then build a routing table entry as set forth within FIG. 5D which identifies the origination segment and destination segment for a frame which originates with mobile workstation 36. As above, acknowledgements from host/server device 18 will not alter the routing table entry for that device and thus a routing path for communication between mobile workstation 36 and host/server device 18 is now completely contained within the routing table associated with router device 30.

Upon reference to the foregoing those skilled in the art will appreciate that the method and system of the present invention provide a technique whereby routing path information for connecting a mobile workstation with a workstation or host/server device within a multisegment local area network may be automatically maintained within each routing device within the multisegment local area network utilizing a normally architected Token Ring Frame Format by constructing and altering the routing tables in the manner set forth herein. Further, this technique obviates any requirement for maintaining and updating routing information within each workstation or host/server device within the multisegment local area network by concentrating that information within a router device and thus does not require the alteration of the control applications within the workstation or host/server devices. In this manner, the routing path information is maintained in a manner which is entirely transparent to the mobile workstation and host/server devices.

While the invention has been particularly shown and described with reference to a preferred embodiment, it will be understood by those skilled in the art that various changes in form and detail may be made therein without departing from the spirit and scope of the invention.

We claim:

1. A method for maintaining a routing path between a selected workstation within a multisegment local area network and a mobile workstation, wherein individual segments within said multisegment local area network are each interconnected utilizing a router device and wherein selected individual segments of said multisegment local area network include a radio frequency transceiver adapted to communicate with said mobile workstation, said method comprising the steps of:

coupling said mobile workstation to said multisegment local area network in response to an initiation of communication between said mobile workstation and a selected radio frequency transceiver within a segment within said multisegment local area network;

establishing a routing table only within each router device;

automatically establishing a routing table entry which identifies a location of said mobile workstation within a routing table associated with each router device within said multisegment local area network in response to an attempted initiation of communication between said mobile workstation and a selected workstation within said multisegment local area network;

automatically establishing a routing table entry which identifies a location of said selected workstation within a routing table associated with each router device within said multisegment local area network in response to an attempted initiation of communication between said selected workstation and said mobile workstation; and automatically deleting each routing table entry which identifies a location of said mobile workstation within each routing table associated with a router device within said multisegment local area network in response to a termination of communication between said mobile workstation and said selected radio frequency transceiver by transmitting an address delete request to each router device within said multisegment local area network from said selected radio frequency transceiver in response to a termination of communication between said mobile workstation and said selected radio frequency transceiver, wherein a routing path between said selected workstation and said mobile workstation may be determined from a routing table associated with each router device within said multisegment local area network without requiring the maintenance of routing path information at each workstation within a set multisegment local area network.

2. The method for maintaining a routing path between a selected workstation within a multisegment local area network and a mobile workstation according to claim 1, wherein said step of automatically establishing a routing table entry which identifies a location of said mobile workstation within a routing table associated with each router device within said multisegment local area network further comprises the step of establishing a routing table entry which identifies a segment location for said mobile workstation and a proposed destination segment location for said selected workstation within a routing table associated with each router device within said multisegment local area network in response to an attempted initiation of communication between said mobile workstation and said selected workstation.

3. The method for maintaining a routing path between a selected workstation within a multisegment local area network and a mobile workstation according to claim 1, wherein said step of automatically establishing a routing table entry which identifies a location of said selected workstation within a routing table associated with each router device within said multisegment local area network further comprises the step of establishing a routing table entry which identifies a segment location for said selected workstation and a proposed destination segment location for said mobile workstation within a routing table associated with each router device within said multisegment local area network in response to an attempted initiation of communication between said selected workstation and said mobile workstation.

4. A system for maintaining a routing path between a selected workstation within a multisegment local area network and a mobile workstation, wherein individual segments within said multisegment local area network are each interconnected utilizing a router device and wherein selected individual segments of said multisegment local area network include a radio frequency transceiver adapted to communicate with said mobile workstation, said system comprising:

means for establishing a routing table only within each router device;

means for coupling said mobile workstation to said multisegment local area network in response to an initiation of communication between said mobile workstation and a selected radio frequency transceiver within a segment within said multisegment local area network;

means for automatically establishing a routing table entry which identifies a location of said mobile workstation within a routing table associated with each router device within said multisegment local area network in response to an attempted initiation of communication between said mobile workstation and a selected workstation within said multisegment local area network;

means for automatically establishing a routing table entry which identifies a location of said selected workstation within a routing table associated with each router device within said multisegment local area network in response to an attempted initiation of communication between said selected workstation and said mobile workstation; and means for automatically deleting each routing table entry which identifies a location of said mobile workstation within each routing table associated with a router device within said multisegment local area network in response to a termination of communication between said mobile workstation and said selected radio frequency transceiver by transmitting an address delete request to each router device within said multisegment local area network from said selected radio frequency transceiver in response to a termination of communication between said mobile workstation and said selected radio frequency transceiver, wherein a routing path between said selected workstation and said mobile workstation may be determined from a routing table associated with each router device within said multisegment local area network without requiring the maintenance of routing path information at each workstation within a set multisegment local area network.

5. The system for maintaining a routing path between a selected workstation within a multisegment local area network and a mobile workstation according to claim 4, wherein said means for automatically establishing a routing table entry which identifies a location of said mobile workstation within a routing table associated with each router device within said multisegment local area network further comprises means for establishing a routing table entry which identifies a segment location for said mobile workstation and a proposed destination segment location for said selected workstation within a routing table associated with each router device within said multisegment local area network in response to an attempted initiation of communication between said mobile workstation and said selected workstation.

6. The system for maintaining a routing path between a selected workstation within a multisegment local area network and a mobile workstation according to claim 4, wherein said means for automatically establishing a routing table entry which identifies a location of said selected workstation within a routing table associated with each router device within said multisegment local area network further comprises means for establishing a routing table entry which identifies a segment location for said selected workstation and a proposed destination segment location for said mobile workstation within a routing table associated with each router device within said multisegment local area network in response to an attempted initiation of communication between said selected workstation and said mobile workstation.

* * * * *